United States Patent [19]

O'Connor

[11] Patent Number: 5,023,395
[45] Date of Patent: Jun. 11, 1991

[54] CABLE SHIELDING TAPE

[75] Inventor: Lawrence J. O'Connor, Manitoba, Canada

[73] Assignee: KT Technologies Inc., Bridgetown, Barbados

[21] Appl. No.: 452,304

[22] Filed: Dec. 19, 1989

Related U.S. Application Data

[62] Division of Ser. No. 172,425, Mar. 23, 1988, Pat. No. 4,898,640.

[30] Foreign Application Priority Data

Mar. 26, 1987 [GB] United Kingdom ............... 8707219

[51] Int. Cl.$^5$ .......................... H01B 7/34; B32B 3/04
[52] U.S. Cl. ..................................... 174/36; 156/54; 156/202; 156/204; 174/107; 428/124; 428/189; 428/209; 428/377
[58] Field of Search ............... 174/36, 102 R, 107, 174/108; 156/53, 54, 201, 202, 264, 265, 269–271, 259–260, 300–303, 552, 554; 428/189, 209, 377, 458, 418, 425.8, 432, 43, 57, 124

[56] References Cited

U.S. PATENT DOCUMENTS

| | | | |
|---|---|---|---|
| 2,907,097 | 10/1959 | Shen | 29/25.42 |
| 3,032,604 | 5/1962 | Timmons | 174/36 |
| 3,279,970 | 10/1966 | Foukal | 156/270 |
| 3,325,589 | 6/1967 | Mildner | 174/36 |
| 3,329,547 | 7/1967 | Denenberg | 156/271 X |
| 3,474,186 | 10/1969 | Hale | 174/107 |
| 3,514,354 | 5/1970 | Andersson | 156/244.19 |
| 3,518,144 | 6/1970 | Jeppsson et al. | 156/244.19 |
| 3,692,063 | 9/1972 | Wagele | 174/107 X |
| 3,769,130 | 10/1973 | Jones, Sr. et al. | 156/265 X |
| 4,323,721 | 4/1982 | Kincaid et al. | 174/107 X |
| 4,406,914 | 9/1983 | Kincaid | 174/36 X |
| 4,596,897 | 6/1986 | Gruhn | 174/36 |
| 4,615,088 | 10/1986 | Bernard et al. | 156/259 X |
| 4,621,777 | 11/1986 | O'Connor | 174/108 X |
| 4,855,534 | 8/1989 | O'Connor | 174/36 |
| 4,898,640 | 2/1990 | O'Connor | 156/204 |

FOREIGN PATENT DOCUMENTS 147123 7/1985 European Pat. Off.
301859 2/1989 European Pat. Off.

Primary Examiner—Morris H. Nimmo
Attorney, Agent, or Firm—Adrian D. Battison; Stanley G. Ade; Murray E. Thrift

[57] ABSTRACT

A cable shielding tape is produced by laminating a single layer of an insulating material film which may be plastic to a conducting layer which may be of metallic foil with one edge of the conducting layer offset laterally with respect to said insulating layer, leaving a foil free edge portion of the insulating layer along one edge of the tape. This can be manufactured by laying the insulating layer tapes in a shingled formation, laminating a web of foil over the tapes and then separating the tapes each with a partial covering of the foil. The conducting layer and insulating layer are coterminous at the opposite edge and both are folded back with the conducting layer outermost.

19 Claims, 3 Drawing Sheets

CABLE SHIELDING TAPE

This application is a divisional from application Ser. No. 172,425 filed Mar. 23, 1988 and now issued as U.S. Pat. No. 4,898,640 and is related in subject matter to the subject matter of U.S. Pat. No. 4,855,534 entitled CABLE SHIELDING TAPE AND CABLES INCORPORATING SUCH TAPE previously application Ser. No. 157,218 filed Feb. 18,1988.

BACKGROUND OF THE INVENTION

This invention relates to a shielding tape for telecommunication cables and the like.

In the manufacture and application of cables for the transmission of high frequency signals, several parameters are highly important. Firstly, the conductor(s) transmitting the signal must be shielded to prevent signal loss by radiation, and also to prevent unwanted external radio frequency and electromagnetic interference from affecting the signals. It is also desirable that adjacent pairs of shielded conductors have such shields electrically insulated from each other to prevent "cross talk" between such adjoining pairs. Furthermore, such shielding must have an acceptable degree of flexibility to accommodate installation and working conditions, must not be excessively heavy or bulky, and must be economical to manufacture and incorporate into the cable. It is also desirable that the resistance of the shield be low enough to dissipate electrical currents impinging thereon, thus limiting the minimum thickness of the conducting layer which can be employed.

It is additionally desirable in certain applications that the shield exhibit circumferential continuity throughout its length, to eliminate the so-called "slot effect" caused by the insulating plastic layer bonded to the conducting layer at the overlap of the tape not allowing continuous circumferential contact of the metallic conductor layer at the overlap.

Prior art has employed a number of practices in attempting to meet the above conditions. The construction mainly used to attempt to meet these requirements is that known as Z-fold in which the above slit laminate has one edge folded back to expose the foil layer outermost and the other edge folded back in the opposite direction to expose the insulating layer outermost. One example of this construction is shown in U.S. Pat. No. 4,621,777 of the present inventor.

This product has been received favourably in the trade, but has a number of disadvantages. Firstly, the folding of the tape involves folding the laminate in its entirety including particularly the plastic insulating layer. This can exhibit springback resulting in an improperly shielded cable which would therefore have to be reworked, retaped or scrapped. In addition the extra thickness of plastic film adds unnecessary bulk and material to the tape.

The formation of tape and its winding into one length packages under current technology also necessarily involves splices in the tape along its length. These splices arise in the individual layers before lamination. and in the tape after lamination and present a significant problem at the folding process. It is essential that the folding process is entirely consistent without any faults since an improper fold will cause an improperly shielded cable. Faults in the folding process are particularly prone to develop at the splices and accordingly must be closely monitored.

In addition, forming of the folded tape into a cylindrical package has raised some problems in that the folded edge of the tape which is wrapped on the inward side of the tape is held firmly, but the folded edge of the tape which is turned outwardly is inclined to unfold thus losing the essential consistency of wrapping in the finished cable product.

It will be appreciated that the total cost of manufacture of the finished cable product is heavily dependent upon the scrap or reject rate and hence any improvement in the consistency of the wrapping process can lead to significant reduction in cost.

Examples of tape construction are shown in U.S. Pat. Nos. 4327246 (Kincaid), 3,325,589 (Mildner), 3,474,186 (Hale) and 4,596,897 (Gruher). It is believed however that the disclosure of tapes in these patents is merel of a theoretical or simplified nature and the composite tapes apparently disclosed in these patents have bee manufactured by laminating foil and plastic laminate to a plastic layer.

SUMMARY OF THE INVENTION

It is therefore an object of this invention to provide a tape which will provide continuous longitudinal and circumferential electrical continuity of the shield, together with isolation between adjacent pairs or conductors, the tape being formed from a single conducting layer and a single insulating layer allowing a reduction in the amount of material.

It is a further object of this invention to provide a tape which is supplied in a pre-folded form and is lighter in weight and more easily applied to the conductors.

According to a first aspect of the invention there is provided a tape consisting of a single conducting layer and a single insulating layer, said conducting layer being laminated by an intervening adhesive layer to one side of said insulating layer with one longitudinal edge of the conducting layer being spaced inwardly from the respective longitudinal edge of the insulating layer to form an edge portion of the insulating layer which is free from said conducting layer, said insulating layer and said conducting layer being coterminous at an opposed longitudinal edge.

Preferably the tape is wound into a package in which the tape traverses axially of the package to form a package width greater than the width of the tape.

According to a second aspect of the invention, there is provided a tape comprising a supporting layer and a layer of metallic foil material carried thereon, said foil layer being laminated by an intervening adhesive layer to one side of said supporting layer with one longitudinal edge of the foil layer being spaced inwardly from a respective one of the longitudinal edges of the supporting layer to form an edge portion of the supporting layer which is free from said foil layer, said supporting layer and said foil layer being coterminous at a longitudinal edge opposite to said one longitudinal edge said foil layer being separated by tearing along said one longitudinal edge thereof from a sheet of a foil material wider than said tape.

According to a third aspect of the invention, there is provided a tape comprising a supporting layer and a layer of a metallic foil material carried thereon when manufactured by a method comprising forwarding a plurality of separate tapes each consisting of comprising a said layer of a supporting material, laying the tapes as they are forwarded in a pattern each relative to the next so that an edge portion of each tape less than the width of the tape lies over an edge portion of a next adjacent tape, while the tapes remain in the pattern, laminating onto the tapes a sheet of said foil material of a width sufficient to cover more than one of the tapes, and separating each of the supporting material tapes from the other supporting material tapes each with a portion of the foil material laminated thereto covering a surface thereof except for said edge portion which is free from said layer of conducting material.

The accompanying drawings represent and illustrate the referenced tape, and a cross section of one of several varieties of cable which can usefully and economically employ such tape.

In the drawings parts not necessary to delineate the invention have been omitted for clarity, and dimensions have been exaggerated or minimized for the same reason.

DETAILED DESCRIPTION

Figure 1:
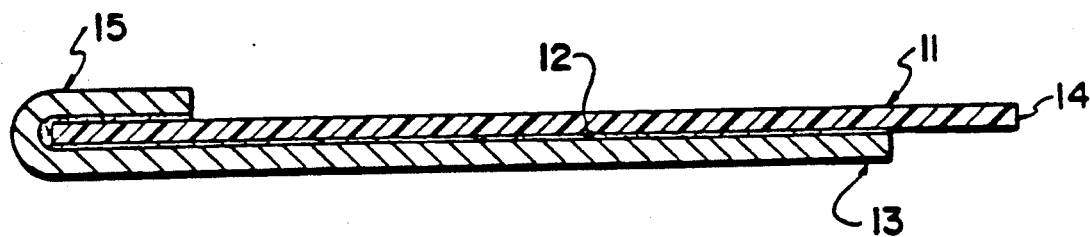
FIG. 1 is a cross sectional view of a first tape according to the invention.

Referring to FIG. 1, 11 represents an insulating plastic film which has been slit to a predetermined width, then laminated in an offset relationship to a conducting layer 13 by means of adhesive 12 which has previously been applied to either layer. Overhang 14 or free portion of the insulating layer provides longitudinal insulation between the conducting layer and any adjacent shielded pairs when the tape is formed or wrapped around said conductors with the foil inwardly. Overhang 15 of conducting layer 13 is folded back over the opposing surface of insulating layer 11 and adhesively laminated or bonded thereto thus providing circumferential continuity of the shield when formed or wrapped around a set of conductors as described above.

Figure 2:
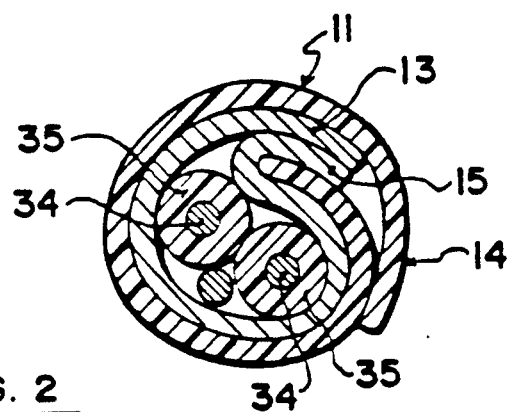
FIG. 2 is a cross sectional view of a typical telecommunication cable employing the tape of FIG. 1.

Referring now to FIG. 2, this represents a typical cross section of a set of pairs in a telecommunication cable in which conductors 34 are surrounded by insulation 35, around which is formed or wrapped the tape of FIG. 1, with conducting layer 13 inwardly. Adhesive layer 12 has been eliminated in this figure for purposes of clarity. It will be noted that overhang 14 of insulating plastic layer 11 contacts said layer forming a insulating layer fully around the conductor assembly thus insulating this pair from adjacent pairs in the same cable. Conducting layer 13 contacts itself by way of folded-back overhang 15, thus establishing circumferential continuity of the shield and eliminating the "slot effect."

The tape according to the invention has the advantages relative to the conventional Z-fold tape that it is easier to handle in the unwinding and wrapping process and that it has a materials saving of up to 40%.

Figure 3:
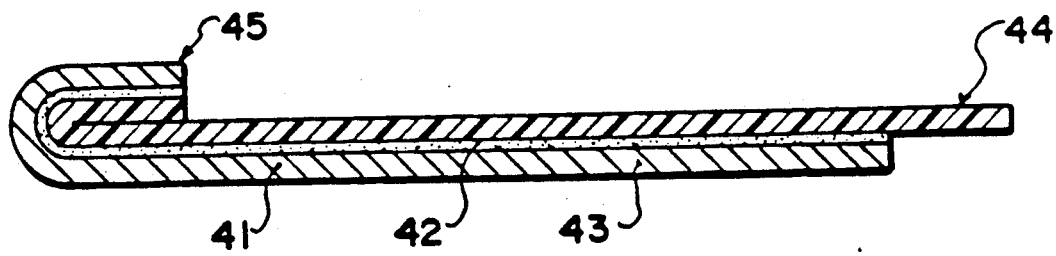
FIG. 3 is a cross-sectional view similar to FIG. 1 of an alternative tape according to the invention.

In FIG. 3 there is shown a modified arrangement of tape for use in the cable of FIG. 2. The tape comprises an insulating layer 44 and a conducting layer 43 which are laminated together by an adhesive layer 42. The lamination is carried out such that the conducting layer 43 is again offset from one edge of the insulating layer to define a portion of the insulating layer which is free from the conducting layer. In this arrangement however both the conducting layer and the insulating layer are folded back at the edge remote from the free edge 44 to define a folded portion 45.

The tape as shown in FIG. 3 is manufactured in a process as follows and as shown schematically in FIGS. 4, 5, 6 and 7.

Figure 4:
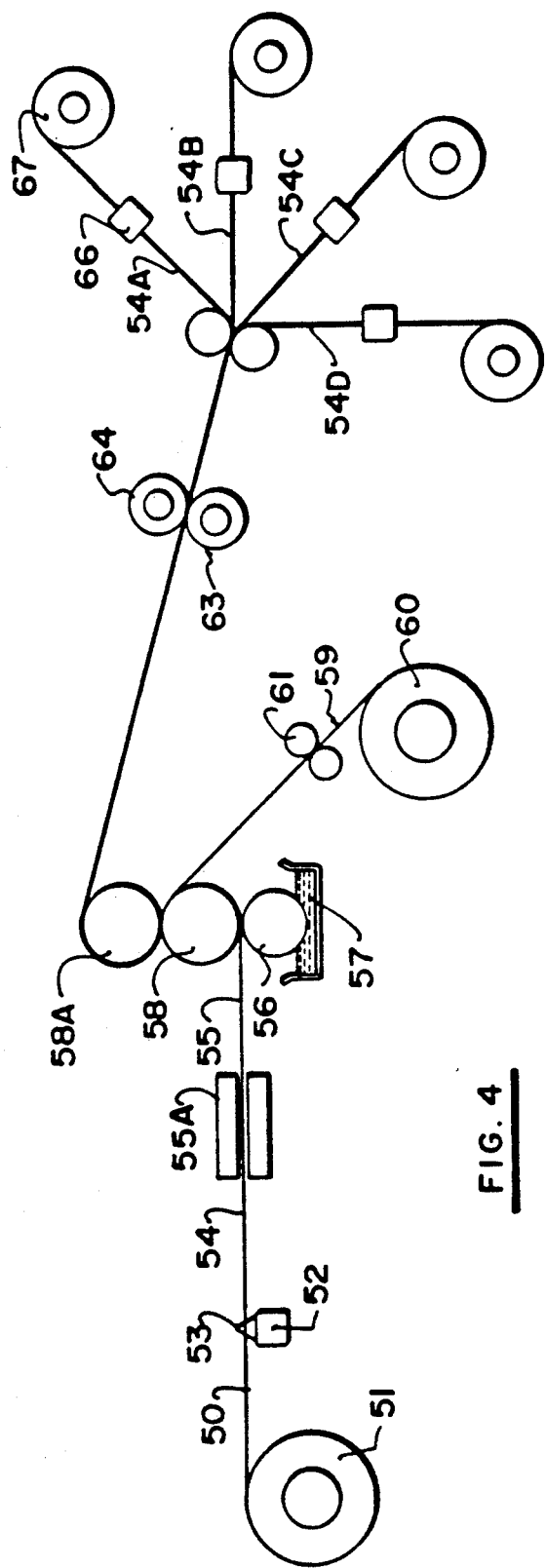
FIG. 4 is a side elevational view showing schematically a process for manufacture of the tape of FIG. 1.
Figure 5:
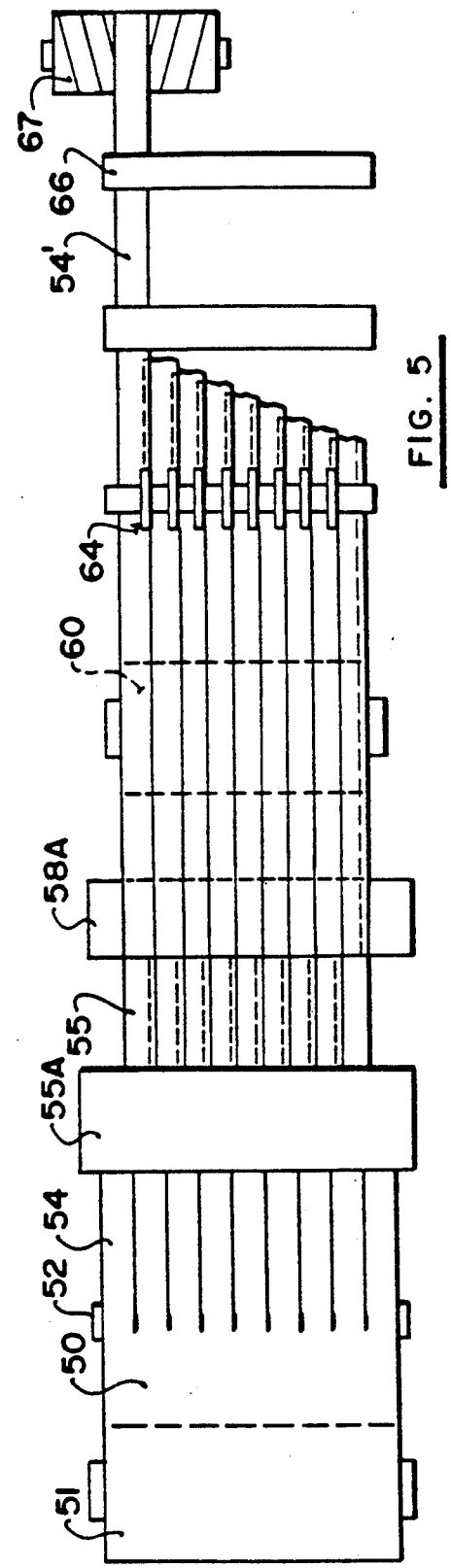
FIG. 5 is a top plan view of the process of FIG. 4.

In FIGS. 4 and 5, a web of the insulating material is indicated at 50 and is supplied on a roll 51 in a width significantly greater than the width of the individual tape. The web is forwarded to a slitter bar indicated at 52 which carries a plurality of slitter knives 53 acting to divide the web into a plurality of slit tapes indicated at 54. The slit tapes are passed through a guide device schematically indicated at 55 which act to guide individual tapes into a slightly overlapping relationship as shown best in FIG. 6. Each individual tape 54A, 54B, 54C and 54D is thus laid so that an edge portion thereof lies on top of an edge portion of the next adjacent tape. The width of the overlap is arranged to be equal to the width of the foil free portion 44 of the tape of FIG. 3.

The overlapping layer of tapes indicated at 55 is then forwarded into contact with a gravure roller 56 which is fed with a hot melt adhesive from a supply indicated at 57. The hot melt adhesive as will be apparent is laid over the lower surfaces of the tapes which are exposed thus leaving the portion 44 which is free from adhesive as it is covered by the edge of the immediately overlying tape.

Figure 6:
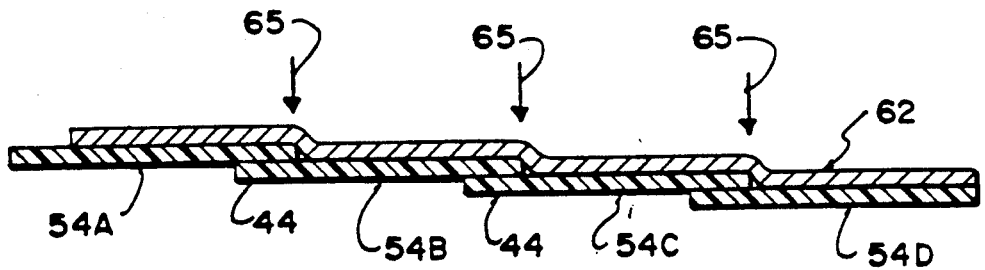
FIG. 6 is a cross-sectional view of one portion of the laminated web showing a plurality of tapes prior to separation.

The coated layer of tapes is then forwarded over a rubber roller 58 with the adhesive on the outer or exposed side. A foil 59 is forwarded from a rolled supply 60 through feed rollers 61 and is laid over the exposed adhesive to form a bond therewith. The layer of the foil or conducting layer is shown in FIG. 6 and indicated at 62. For convenience the adhesive layer is omitted from FIG. 6. The foil in web width is therefore bonded to the layer of tapes while the tapes and the adhesive remain carried on the roller 58 and the foil remains in web width allowing it to have sufficient strength to undergo the forces involved in the unwinding and lamination processes. The laminated web then passes through a nip between the laminating roller 58 and a re-directing roller 58A.

Figure 7:
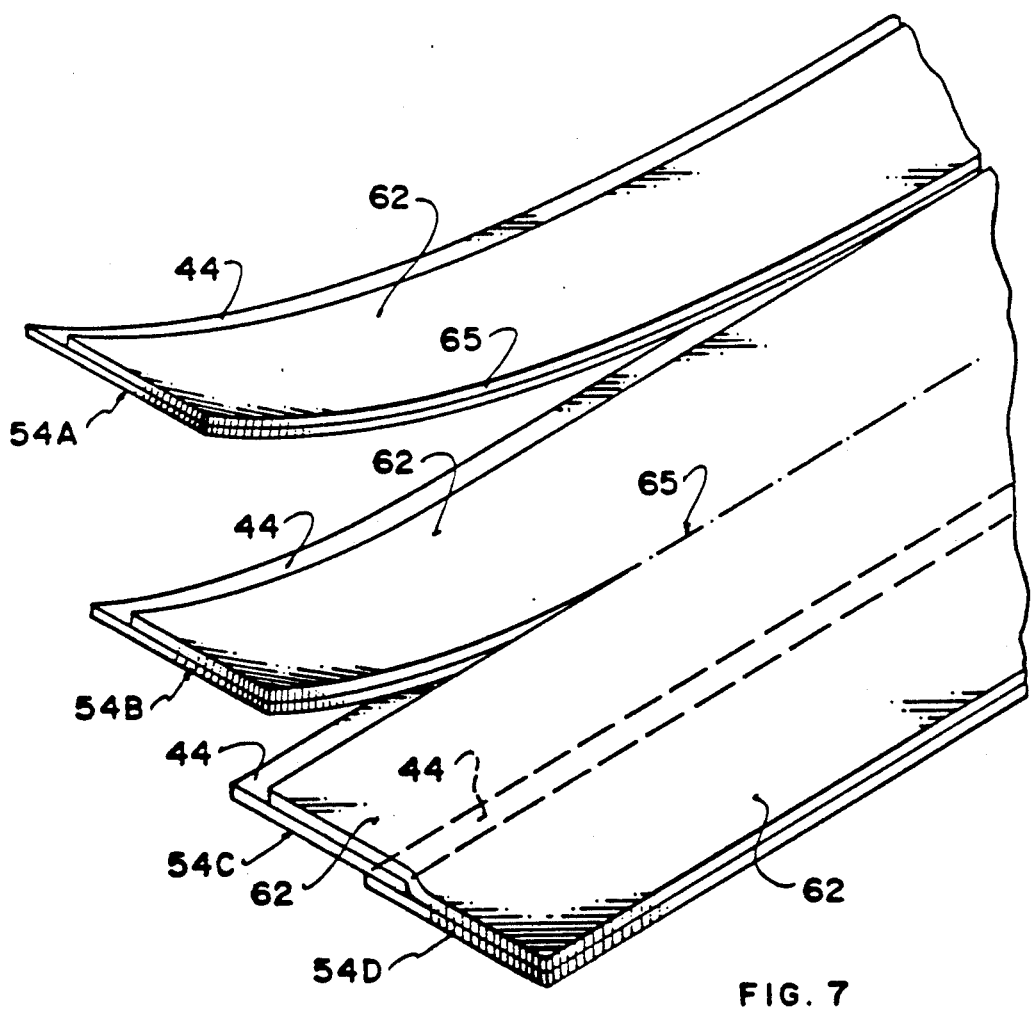
FIG. 7 is an enlarged isometric view showing the tapes in the step of separation.

Downstream of the lamination on the roller 58, the laminated construction shown in FIG. 6 is forwarded to a nip roller 63 and a plurality of wheels 64 each of which acts to perforate or score or mark the foil along the line indicated at 65 in FIG. 6. This line lies along the foil at the edge of each of the tapes 54A etc. and enables the tapes to be separated as indicated in FIG. 7 by lifting the tape 54A away from the tape 54B thus tearing the foil layer 62 along the line 65. Each of the tapes is separated in turn as shown in FIGS. 4 and 7 and passed to a folding shoe indicated at 66. The folding shoe acts to fold back the edge of the tape as indicated at 45 in FIG. 3 following which the tape is wound onto a package 67 which is arranged so that the fold 45 lies inwardly of each wrap of tape and is wrapped thereby.

The tape is intended for shielding of cables for the transmission of high frequency signals. In such cables the conductor or conductors have generally a size of the order of 22,24,26 AWG which is of course is significantly different from that of power cables. In order to cover such transmission cables, the width of the tape, that is the effective width of the foil known as the "foil width" of the tape will generally lie in the range 0.25 to 2 inches. As the conducting foil layer is not intended to carry any significant current, it is of a very thin nature and generally in the range 0.00025 to 0.004 inches. The thickness of the plastic insulating layer generally selected in dependence upon a required mechanical strength for the tape. The thickness of the insulating plastic layer will therefore generally lie in the range 0.00048 to 0.003 inches with the latter being an extreme case.

The width of the free portion of the insulating layer will generally lie in the range 0.031 to 0.125 inches of the width of the tape. The width of the folded portion of the conducting foil layer is sufficient merely to obtain structural stability that is the fold remains in place to ensure proper contact with the underside of the foil when wrapped around the cable. In such cases the width of the folded portion will lie generally in the range 0.031 to 0.125 inches.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A tape consisting of a single conducting layer, a single insulating layer and an intervening adhesive layer, said conducting layer being laminated by said intervening adhesive layer to one side of said insulating layer with one longitudinal edge of the conducting layer being spaced inwardly from the respective longitudinal edge of the insulating layer to form an edge portion of the insulating layer which is free from said conducting layer, said insulating layer and said conducting layer being coterminous at an opposed longitudinal edge, both said conducting layer and said insulating being commonly folded at said opposed longitudinal edge with said conducting layer outermost.

2. The invention according to claim 1 wherein the thickness of the conducting layer lies in the range 0.00025 to 0.004 inches.

3. The invention according to claim 1 wherein the thickness of the insulating layer lies in the range 0.00048 to 0.003 inches.

4. The invention according to claim 1 wherein the width of the tape lies in the range 0.25 to 2.0 inches.

5. The invention according to claim 1 wherein the free portion of the insulating layer has a width not greater than than 0.125 inches.

6. The invention according to claim 1 wherein the insulating layer and the conducting layer are folded at the opposed longitudinal edge to form a folded portion of a width not greater than 0.125 inches.

7. A tape comprising a supporting layer and a layer of metallic foil material carried thereon, said foil layer being laminated by an intervening adhesive layer to one side of said supporting layer with one longitudinal edge of the foil layer being spaced inwardly from a respective one of the longitudinal edges of the supporting layer which is free from said said foil layer, said supporting layer and said foil layer being coterminous at a longitudinal edge opposite to said one longitudinal edge, said foil layer being separated from a sheet of a foil material wider than said tape by tearing of he foil material of the sheet along said one longitudinal edge of the foil layer.

8. The invention according to claim 7 wherein the thickness of the foil layer lies in the range of 0.00025 to 0.004 inches.

9. The invention according to claim 8 wherein in the thickness of the supporting layer lies in the range 0.00048 to 0.003 inches.

10. The invention according to claim 7 wherein the width of the tape lies in the range 0.25 to 2.0 inches.

11. The invention according to claim 7 wherein the free portion of the supporting layer has a width not greater than 0.125 inches.

12. The invention according to claim 7 wherein the foil layer and the supporting layer are folded at the opposite longitudinal edge to define a folded portion of the width not greater than 0.125 inches with the foil layer outermost.

13. The invention according to claim 7 wherein both the supporting layer and the foil layer ar commonly folded at said opposed longitudinal edge with said foil layer outermost.

14. A tape comprising a layer of a supporting material and a layer of a metallic foil material carried thereon when manufactured by a method comprising forwarding a plurality of separate tapes each comprising a layer of said supporting material, laying the tapes as they are forwarded in a pattern each relative to the next so that an edge portion of each tape less than the width of the tape lies over an edge portion of a next adjacent tape, while the tapes remain in the pattern, laminating onto the tapes a sheet of said foil material of a width sufficient to cover more than one of the tapes, and separating each of the supporting material tapes from the other supporting material tapes each with a portion of the foil material laminated thereto covering a surface thereof except for said edge portion which is free from said layer of conducting material.

15. A tape according to claim 14 wherein the method includes marking the layer of foil material on each tape at an intended separation line thereon so as to weaken the layer at the line for separation of each tape from the next adjacent tape.

16. A tape according to claim 14 wherein the method includes the step of folding the tape after separation thereof at a longitudinal edge thereof opposite to said edge portion with said layer of conducting material outermost.

17. A tape according to claim 14 wherein the supporting material layer consists of a single layer of an insulating material.

18. A tape according to claim 14 wherein the thickness of said layer of foil material is in the range of about 0.00025 to 0.001 inches.

19. A tape according to claim 14 wherein the thickness of said supporting material is in the range of about 0.00048 to 0.003 inches.

* * * * *